(12) United States Patent  (10) Patent No.: US 7,533,089 B2
Pan et al.  (45) Date of Patent: *May 12, 2009

(54) HYBRID APPROACH FOR QUERY RECOMMENDATION IN CONVERSATION SYSTEMS

(75) Inventors: Shimei Pan, Armonk, NY (US); James C. Shaw, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/475,785

(22) Filed: Jun. 27, 2006

(65) Prior Publication Data

US 2007/0299824 A1 Dec. 27, 2007

(51) Int. Cl.
*G06F 7/00* (2006.01)
*G06F 17/30* (2006.01)

(52) U.S. Cl. .................................. 707/4; 707/5
(58) Field of Classification Search .......... 707/3–6
See application file for complete search history.

(56) References Cited

U.S. PATENT DOCUMENTS

| | | | |
|---|---|---|---|
| 6,742,021 B1 * | 5/2004 | Halverson et al. | 709/218 |
| 6,820,075 B2 * | 11/2004 | Shanahan et al. | 707/3 |
| 2005/0267871 A1 * | 12/2005 | Marchisio et al. | 707/3 |
| 2007/0185868 A1 * | 8/2007 | Roth et al. | 707/6 |
| 2008/0215555 A1 * | 9/2008 | Pan et al. | 707/3 |

OTHER PUBLICATIONS

S. Pan et al., "Two-Way Adaptation for Robust Input Interpretation in Practical Multimodal Conversation Systems," In Proc. of IUI '05, 8 pages, Jan. 2005.
H.W. Hastie et al., "Context-Sensitive Help for Multimodal Dialogue," In Proc. of the International Conf. on Multimodal Interfaces, 6 pages, 2002.
Adelheit Stein, "Active Help and User Guidance in a Multimodal Information System: A Usability Study," In Report ABIS-98, 12 pages, 1998.
C.A. Kamm et al., "From Novice to Expert: The Effect of Tutorials on User Expertise with Spoken Dialogue Systems," In Proc. of ICSLP, 4 pages, 1998.
M.A. Walker et al., "What Can I Say?: Evaluating a Spoken Language Interface to Email," In Proc. of CHI, pp. 1-8, 1998.

(Continued)

*Primary Examiner*—Hung T Vy
(74) *Attorney, Agent, or Firm*—Ryan, Mason & Lewis, LLP

(57) ABSTRACT

Techniques are disclosed for combining natural language generation with query retrieval for context appropriate query recommendation. For example, a computer-implemented method for generating a recommended query for a conversation system in response to an original user query, wherein at least a portion of the original user query is not understandable to a query interpretation process, includes the following steps. Recommendation results are computed, in response to the original user query, using a natural language generation-based recommendation process. Recommendation results are computed, in response to the original user query, using a retrieval-based recommendation process. A recommended query is generated based on consideration of at least a portion of the natural language generation-based recommendation results and at least a portion of the retrieval-based recommendation results.

1 Claim, 3 Drawing Sheets

OTHER PUBLICATIONS

P.A. Duboue et al., "Statistical Acquisition of Content Selection Rules for Natural Language Generation," In Proc. of EMNLP, 8 pages, 2003.

R. Barzilay et al., "Collective Content Selection for Concept-to-Text Generation," In Proc. HLT/EMNLP, 8 pages, 2005.

K.R. McKeown et al., "Language Generation for Multimedia Healthcare Briefings," In Proc. of ANLP, pp. 277-282, 1997.

M.A. Walker et al., "Training a Sentence Planner for Spoken Dialogue Using Boosting," Computer Speech and Language, pp. 1-31, 2002.

Irene Langkilde, "Forest-Based Statistical Sentence Generation," In Proc. of the NAACL, 8 pages, 2000.

James Shaw, "Clause Aggregation Using Linguistic Knowledge," In Proc. of IWNLG, 10 pages, 1998.

William W. Cohen, "Fast Effective Rule Induction," In Proc. of the 12th International Conf. of Machine Learning (ICML), 9 pages, 1995.

S. Pan et al., "SEGUE: A Hybrid Case-Based Surface Natural Language Generator," In Proc. of INLG, 10 pages, 2004.

* cited by examiner

HYBRID APPROACH FOR QUERY RECOMMENDATION IN CONVERSATION SYSTEMS

FIELD OF THE INVENTION

The present invention generally relates to a method for query recommendation in conversation systems and, more particularly, to a hybrid method that combines natural language generation with query retrieval for context appropriate query recommendation.

BACKGROUND OF THE INVENTION

Conversation systems allow users to interact with computer systems. In order to assist the user with such interaction, some conversation systems employ query recommendation. Existing approaches for query recommendation in conversation systems include tutorials or context-sensitive help.

Tutorials are often too brief to cover all valid input requests. Existing approaches for context-sensitive help also have limitations.

For example, finite state machine-based approaches do not scale well. Depending on the granularity of the predicted classes, a decision tree-based help system may be too coarse to provide guidance on the exact wording for each problematic user request. In addition, depending on the coverage of the query corpus used in retrieval-based query recommendation systems, the most relevant pre-stored examples may not be close enough to the current user query to be useful.

Accordingly, it would be desirable for a query recommendation technique to be able to provide scalable, fine-grained, context-sensitive help on the exact wording of a user query.

SUMMARY OF THE INVENTION

Principles of the invention provide a hybrid method that combines natural language generation with query retrieval for context appropriate query recommendation.

For example, in one aspect of the invention, a computer-implemented method for generating a recommended query for a conversation system in response to an original user query, wherein at least a portion of the original user query is not understandable to a query interpretation process, includes the following steps. Recommendation results are computed, in response to the original user query, using a natural language generation-based recommendation process. Recommendation results are computed, in response to the original user query, using a retrieval-based recommendation process. A recommended query is generated based on consideration of at least a portion of the natural language generation-based recommendation results and at least a portion of the retrieval-based recommendation results.

The natural language generation-based recommendation result computing step may include selecting content for use in generating the recommended query. The content selection step may include extracting one or more features from at least one of the original user query and interpretation results generated by the query interpretation process, wherein the one or more extracted features characterize a current interpretation problem associated with the original user query. The content selection step may further include, based on the one or more extracted features, determining and applying one or more rules for use in revising at least a portion of the original user query to generate semantic content for use in generating the recommended query.

Further, the natural language generation-based recommendation result computing step may further include, based on the semantic content, generating a grammatically-appropriate sentence which forms the recommended query. The grammatically-appropriate sentence generating step may further include retrieving one or more of words, phrases and sentence segments from at least one of the original user query and a query corpus to convey the semantic content for the recommended query.

The retrieval-based recommendation result computing step may include computing one or more similarity scores based on the original user query and one or more example queries from a query corpus. The one or more similarity scores may include one or more of a surface similarity score, a semantic similarity score, and a context similarity score. The one or more similarity scores may be used to identify one or more of the example queries from the query corpus to be included as part of the retrieval-based recommendation results.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention provide a hybrid query recommendation framework that facilitates robust natural language interaction for systems with imperfect interpretation. When receiving a problematic user query that can not be understood by the natural language interpreter of a conversation system, the method dynamically recommends valid queries that are most relevant to the current user request. Based on the recommendations, the user can revise his request accordingly so that the next round of conversation will be more successful.

More particularly, as will be explained in detail below, an exemplary embodiment of the invention provides a hybrid query recommendation framework which combines natural language generation with query retrieval to improve the robustness of query understanding. That is, such framework may help users recover from a conversation system's input interpretation problem.

Further, exemplary embodiments of the invention not only take into consideration the robustness of the recommendation system, but also its scalability so that it is feasible for non-trivial conversation applications.

Still further, another exemplary embodiment of the invention provides accurate and context-sensitive recommendations that help users revise problematic queries so that the revised queries have a better chance to be understood by the system.

Accordingly, principles of the invention provide a hybrid query recommendation framework that is executable within a multimodal conversation application. An example of a particular multimodal conversation application is in the real-estate domain in which potential home buyers interact with the system using multiple modalities, such as speech and gesture, to request residential real-estate information. The hybrid query recommendation framework executing within the application takes a problematic user query, associated system interpretation results, and the current conversation context as input and formulates query recommendations that are most relevant to the current user query.

It is to be understood that while an example conversation system domain is given as a real-estate application, principles of the invention are not limited to any particular domain or conversation system architecture.

Figure 1:
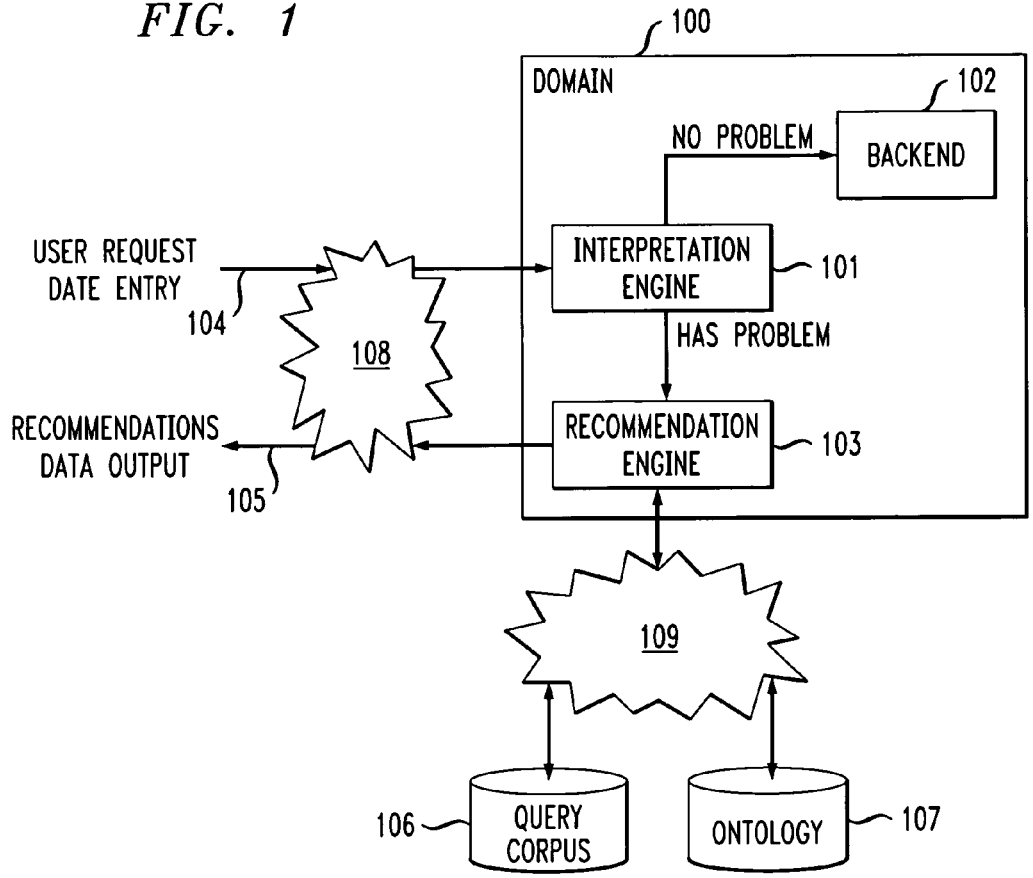
FIG. 1 is a diagram illustrating implementation of a hybrid query recommendation method in a conversation system, according to an embodiment of the invention.

Referring now to FIG. 1, a hybrid query recommendation method is shown being implemented within the capabilities of computing resources. The method is shown as module 103 within a domain 100. The domain can be any one of a multitude of environments that accept requests for information. The domain example used throughout this description is that of the real-estate domain. In the real-estate domain, a user can query a system for information regarding specific houses, towns or schools.

The user request is then sent to an interpretation engine 101 for analysis. If the interpretation engine can understood the user query without any problem, the interpretation result is sent to the backend 102 for further processing. If the interpretation engine 101 has a problem understanding the input query, recommendation engine 103 is activated and it suggests a set of alternative queries to guide the user to revise his original query.

The domain 100 is typically implemented within a central processing unit. It interfaces with external data entry 104 and data output 105 elements through a network 108. The network may be any one of several types of connectivity including, but not limited to, a local area network, a wide area network such as, but not limited to, connectivity through the Internet.

The data entry 104 may include, but not be limited to, a keyboard, a voice recognition device, a mouse, a touch sensitive screen, or other such devices. The data output 105 element may include, but not be limited to, a computer screen, a printer, a video display, monitor, or other such devices. Likewise, the system for performing the method, software or firmware containing the instruction set for performing the method can be processed within a central processing unit or other computer resource.

Recommendation engine 103 produces the solutions based on examples in a query corpus 106 which is stored either within the domain 100 or, as shown in FIG. 1, in a separate storage medium and/or database. The recommendation engine 103 may also use additional data sources such as ontology 107. Both the query corpus 106 and domain ontology are accessed through a communication link 109. The communication link 109 may be a local area or wide area network. The communication link 109 may also be a direct connection such as a bus internal to the domain 100. By accessing the query corpus 106 to formulate the solution, the recommended queries can demonstrate desired properties, such as scalability and robustness.

For the real-estate domain example, a user would submit a request about a particular house, town or school through the data entry 104 element. The interpretation engine 101 will analyze the request. If the interpretation engine 101 can understand the user request without any problem, the interpretation results will be sent to the backend 102 for data retrieval and data presentation. If the interpretation engine 101 has a problem understanding the user request or part of the user request, the query recommendation engine 103 is called to suggest valid alternative queries. These alternative queries are sent to the user through the data output element 105. After receiving recommended queries, the user will revise his original request or submit a new request.

Note that elements shown in subsequent figures having the same reference numeral as shown in FIG. 1 have the same or similar functions as described above.

Figure 2:
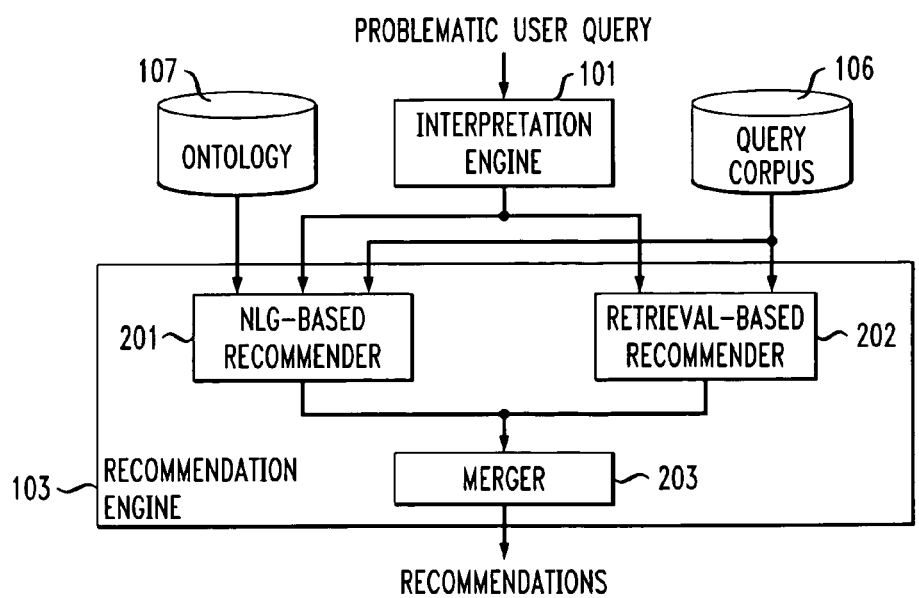
FIG. 2 is a diagram illustrating a query recommendation system, according to an embodiment of the invention.

Referring now to FIG. 2, details of recommendation engine 103 are shown. More particularly, FIG. 2 illustrates a hybrid query recommendation engine.

As shown, there are two independent recommenders in the recommendation engine: a natural language generation (NLG)-based recommender 201 and a retrieval-based recommender 202. The NLG-based recommender 201 takes the interpretation results from the interpretation engine 101 as its input. In addition, recommender 201 also uses resources such as the query corpus 106 and ontology 107 as its knowledge base. Its output is a set of ranked query recommendations.

Similarly, the retrieval-based recommender 202 produces a separate set of recommendations based on the interpretation results as well as the examples in the query corpus 106. Since each recommender produces a set of recommendations independently, both sets of recommendations are sent to the merger 203 to form the final recommendations. One embodiment of a method for query merging selects the final recommendations proportionally from the candidates produced by each recommender.

Figure 3:
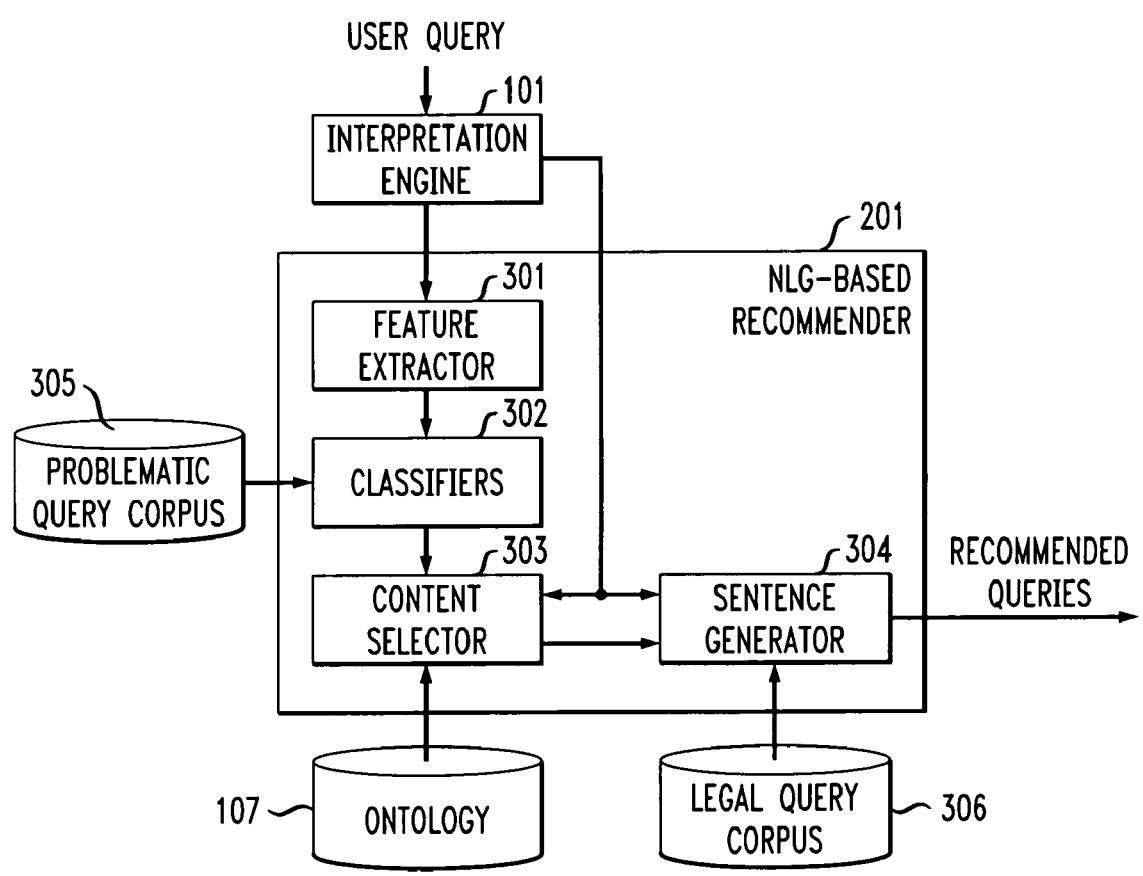
FIG. 3 is a diagram illustrating a natural language generation (NLG)-based recommendation process using knowledge sources such as ontology and query corpus, according to an embodiment of the invention.

We now refer to FIG. 3 for details on NLG-based recommender 201. Once a problematic user request is detected by interpretation engine 101, the user query and the interpretation results are sent to the NLG-based recommender for analysis. In the NLG-based recommender, the content selector 303 decides the content for each recommendation. The sentence generator 304 forms a grammatical sentence to convey the content in each recommendation. One embodiment of a content selection method uses a classification-based machine learning approach to categorize the current interpretation problem and decide proper content revision operators. Another embodiment of the method may use manually crafted content selection rules to suggest the content of alternative queries.

FIG. 3 shows a classification-based content selection approach. Using this method, the feature extractor 301 automatically derives a set of syntactic, semantic and surface features from the input query. Table 1 lists typical features extracted from an input query "Show houses in GOOD school districts" in which "good" is an unknown word to the system.

TABLE 1

FEATURES EXTRACTED FOR CONTENT SELECTION

| No | Name | Definition | Example |
|---|---|---|---|
| 1 | Element Syntactic Relation | The relationship between the problem element and the element anchor | Modifier-Head |
| 2 | Problem Element POS | The POS of the problem element | Adjective |
| 3 | Problem Element Role | The role played by the problem element in its relationship with its anchor | Modifier |
| 4 | Problem Element Classification | Further classification for WOI words. For OOV words, always assign "other" | Quality |
| 5 | Anchor Element POS | The POS for the anchor element | NP |
| 6 | Anchor Element Role | The role played by the anchor element in its relationship with the problem element | Head |
| 7 | Anchor Element type | The semantic type associated with the anchor element | Known-Concept |
| 8 | Problem Segment Syntactic Relation | The syntactic relation between the problem and the anchor segment | Modifier-Head |
| 9 | Problem Segment POS | The POS for the problem segment | NP |
| 10 | Problem Segment Role | The role played by the problem segment in its relationship with its anchor | Modifier |
| 11 | Anchor Segment POS | The POS for the Anchor Segment | Noun |
| 12 | Anchor Segment Role | The role played by the anchor segment in its relationship with the problem segment | Head |
| 13 | Anchor Segment Type | The semantic type associated with the anchor segment | Known-Concept |

Based on the feature vector extracted by the feature extractor 301 as well as the training examples in a problematic query corpus 305 (part of query corpus 106), the classifier 302 selects one or more content revision operators (or rules), indicating proper ways to revise the original user query to form the semantics of a recommendation. Table 2 lists the most common content revision operators designed for structured information-seeking applications. The operators are defined based on domain independent concepts such as objects, attributes, constraints, and operators specified in Standard Query Language (SQL).

Given the semantics for each recommended query, the sentence generator 304 produces a grammatical sentence to convey the semantics in a recommendation. One embodiment of the sentence generator uses cases-based reasoning and rule-based adaptation to formulate grammatical sentences. Another embodiment of the sentence generator uses template-based approach to generate fluent sentences based on sentence templates. Another embodiment of the sentence generator produces fluent sentence based on English grammar.

TABLE 2

CONTENT REVISION OPERATORS

| Name | Description | Example |
|---|---|---|
| Op-Constraint-Ontology | Replace an un-interpretable word with constraints that are compatible with the word and the ontology | Replace "good" in "good school district" with all the quality-related school district constraints |
| Op-Constraint-Attribute | Replace an un-interpretable word with constraints that are compatible with the current attribute | Replace "low" in "Houses with low tax" with a constraint on the house attribute AnnualTax |
| Op-Attribute-Ontology | Replace an un-interpretable word with attributes that are compatible with the ontology | Replace "size" in "the size of the house" with an attribute of house that is compatible with size e.g., square footage. |
| Op-Operator-Ontology | Replace un-interpretable word with a known operator | Replace "save" in "save the houses" with a known operator "show" |

After receiving the content revision operators from the classifier 302, the content selector 303 applies each content revision operator to the interpretation result of the current user query one by one and formulates the semantic representation of alternative queries.

Ontology 107 is used by the content selector 303 as follows. As mentioned above, input to the content selector is a set of content revision operators. For example, if the user query is "show xxx of houses in Pleasantville" and if one of the content revision operators selected by the classifier 302 is OpAttributeOntology, the content selector will replace xxx with a house attribute. To do this, it sends an inquiry to ontology 107 to retrieve all the possible house attributes and generate one recommendation for each house attribute. Some generated recommendations are as follows: "show the price of the house," "show the age of the house," "show the school district of the house," etc.

FIG. 3 illustrates a preferred embodiment in which the system uses a cascade model in case-based sentence generation. In the cascade model, the sentence generator 304 first retrieves words, phrases and sentence segments that can convey some of the content in a recommendation from the current user query. Then, the sentence generator retrieves words, phrases and sentence segments from the legal query corpus 306 (part of query corpus 106) to convey the rest of the content in a recommendation. Finally, the system applies adaptation rules to combine all the words, phrases and sentence segments to form a fluent and grammatical sentence.

It is to be understood that the NLG-based recommender may also employ known natural language generation techniques, by way of example only, techniques described in Shimei Pan and James Shaw, "SEGUE: A Hybrid Case-Based Surface Natural Language Generator," Proceedings of the Third International Conference of Natural Language Generation, pages 130-140, Brockenhurst, UK, July 2004.

Figure 4:
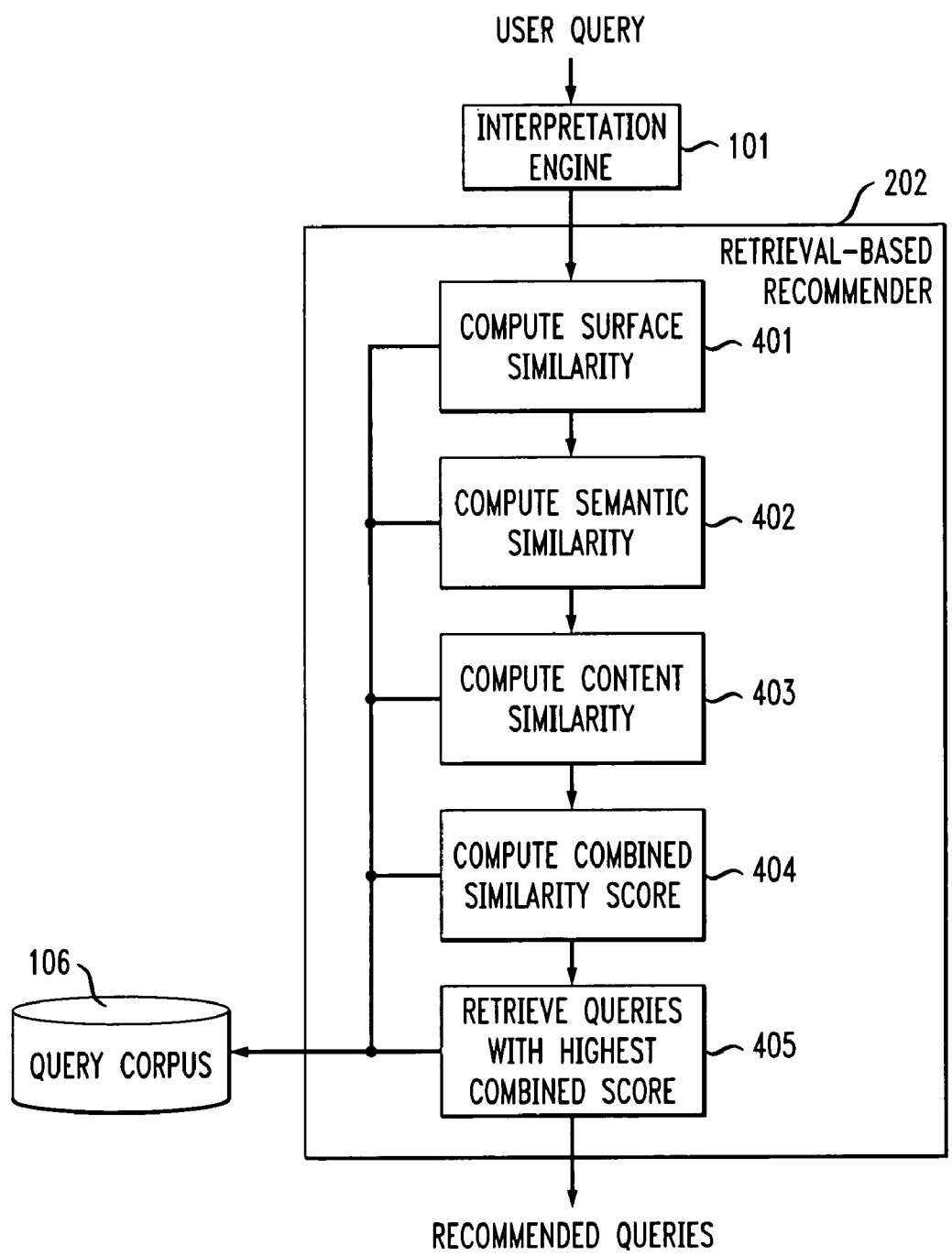
FIG. 4 is a diagram illustrating a retrieval-based recommendation process using knowledge sources such as query corpus, according to an embodiment of the invention.

FIG. 4 presents details on retrieval-based recommender 202. For each query example in the query corpus 106, the system first computes its surface similarity to the current user query (module 401). One embodiment of a method for computing surface similarity is based on the String Edit Distance. Another embodiment of a method for computing surface similarity is based on the number of overlapping content words. Another embodiment of a method for computing surface similarity is based on the cosine measure.

The system also computes semantic similarity (module 402) based on the interpretation results produced by the interpretation engine 101. One embodiment of a method for computing semantic similarity is based on semantic graph matching. Another embodiment of a method for computing semantic similarity is based on the number of overlapping nodes in the semantic graph.

In addition, the system also computes context similarity (module 403). One embodiment of a method for computing context similarity is based on the Euclidian distance between two context feature vectors.

Next, a combined similarity score is computed based on a linear combination of each individual similarity score (module 404).

Finally, the combined score is used to rank all the examples in the query corpus 106 and the ones with the highest combined similarity score (module 405) are considered for suggested to the user.

Advantageously, as illustratively described herein, principles of the invention provide a method for a hybrid query recommendation framework that combines natural language generation-based recommendations with retrieval-based results to facilitate robust natural language interaction for conversation systems with imperfect interpretation. When receiving a problematic user query, the recommendation system dynamically recommends valid queries that are most relevant to the current user request so that the user can revise his request accordingly. Comparing with existing methods, our approach offers several major advantages, for example: improving query recommendation quality and system scalability by dynamically composing new queries for recommendation, and combining NLG-based recommendations with retrieval-based results to improve robustness.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for generating a recommended query for a conversation system in response to an original query, wherein at least a portion of the original query is not understandable to a query interpretation process, the method comprising the steps of:

computing query recommendation results, in response to the original query, using a natural language generation-based recommendation process, wherein the natural language generation-based recommendation result computing step comprises the steps of:

selecting content for use in generating the recommended query, wherein the content selection step comprises the steps of:

extracting one or more features from at least one of the original query and interpretation results generated by the query interpretation process, wherein the one or more extracted features characterize a current interpretation problem associated with the original query;

based on the one or more extracted features that characterize the current interpretation problem exhibited by the interpretation results generated by the query interpretation process, determining and applying one or more rules, indexed by the current interpretation problem, for use in revising at least a portion of the original query to generate semantic content for use in generating the recommended query; and based on the semantic content, generating a grammatically-appropriate sentence which forms the recommended query, wherein the grammatically-appropriate sentence generating step further comprises retrieving one or more of words, phrases and sentence segments from at least one of the original query and a query corpus to convey the semantic content for the recommended query;

computing query recommendation results, in response to the original query, using a retrieval-based recommendation process, wherein the retrieval-based recommendation result computing step comprises the step of computing one or more similarity scores based on the original query and one or more example queries from a query corpus;

generating a recommended query by proportionately merging at least a portion of the natural language generation-based query recommendation results and at least a portion of the retrieval-based query recommendation results; and sending the recommended query back to a sender of the original query such that a subsequent query can be sent based on the recommended query.

\* \* \* \* \*